Aug. 10, 1965
L. C. HANSON
3,200,237
HEATING UNIT
Filed Feb. 6, 1963
3 Sheets-Sheet 1
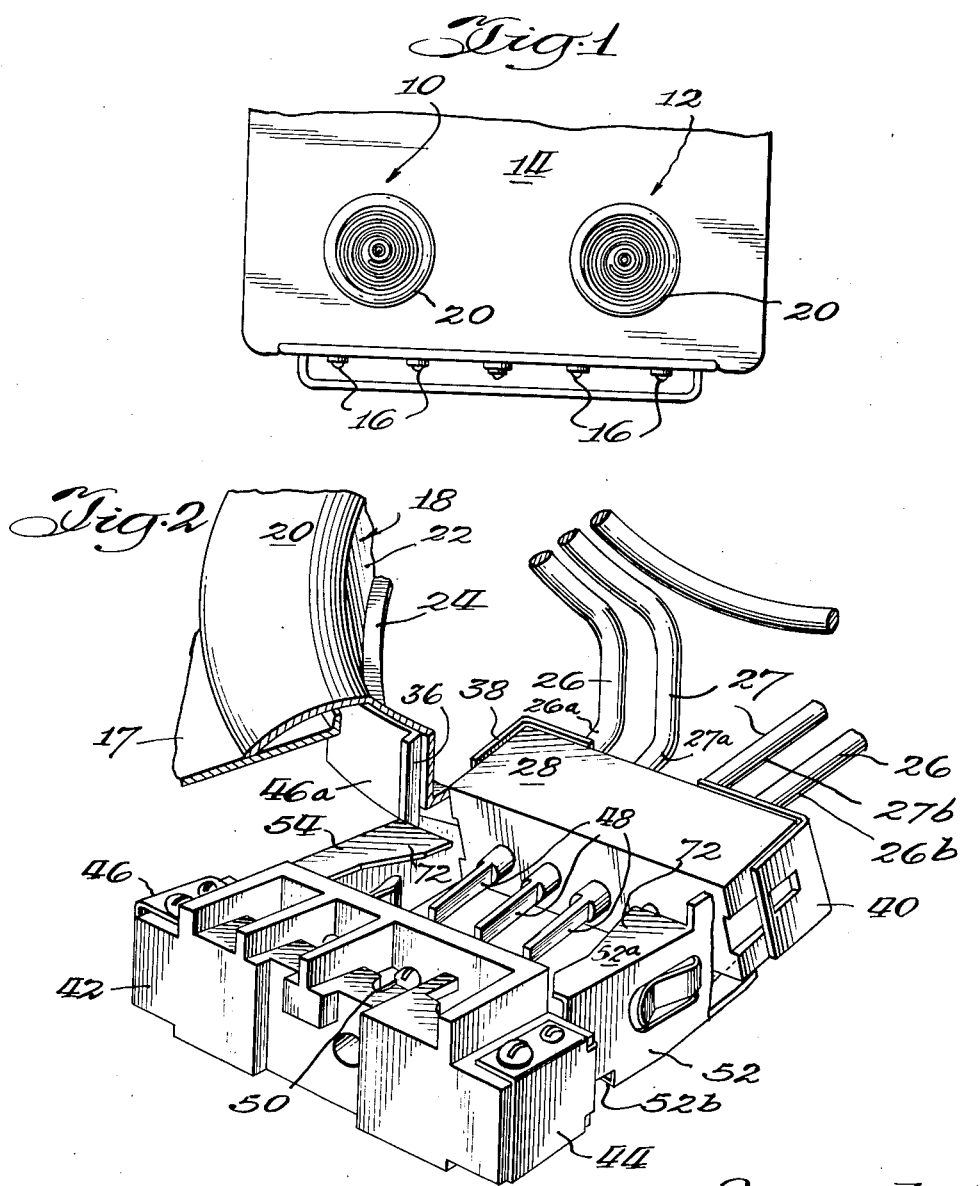
Inventor
Leroy C. Hanson
By Hofgren, Wegner, Allen, Stellman & McCord
Attorneys

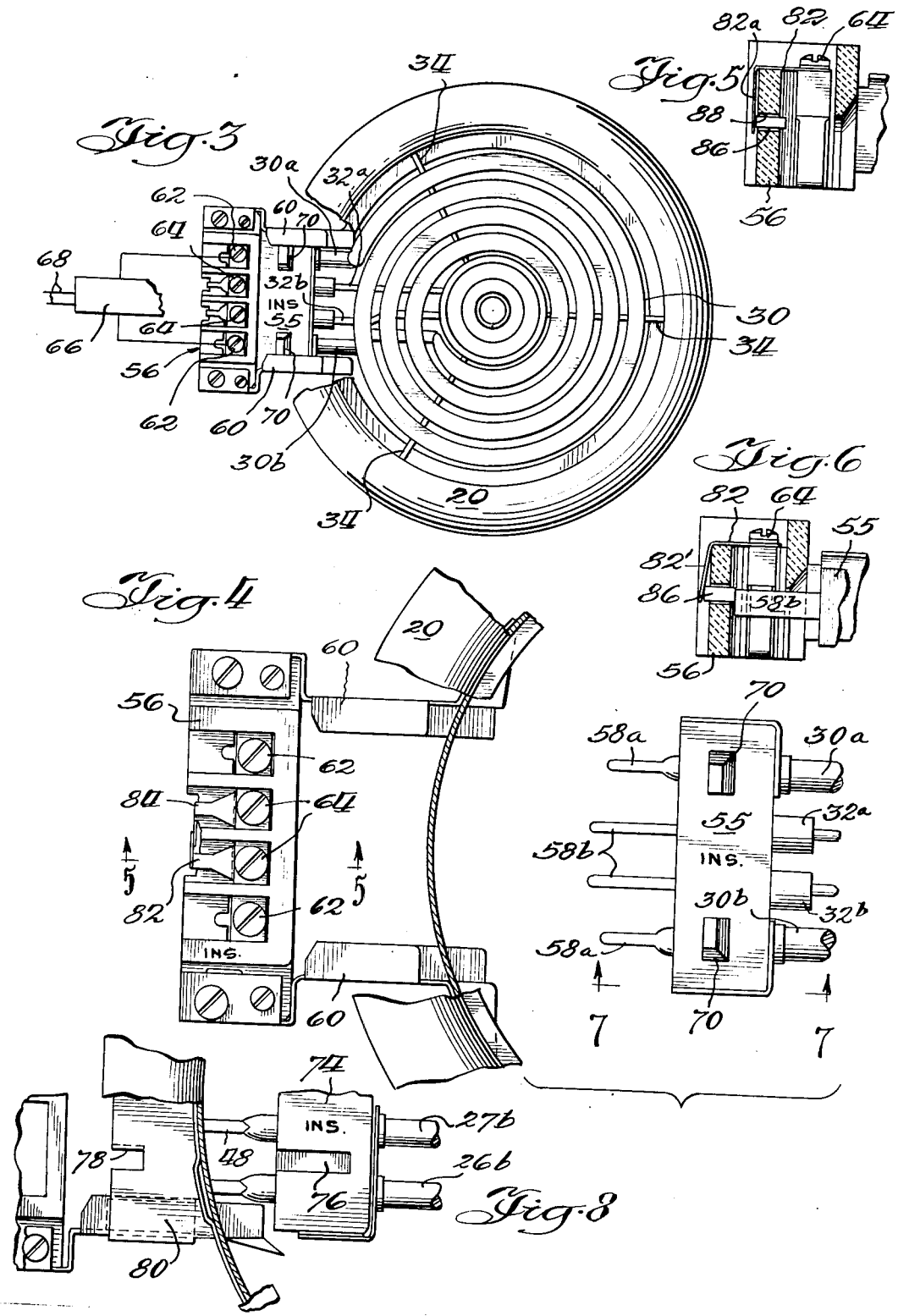

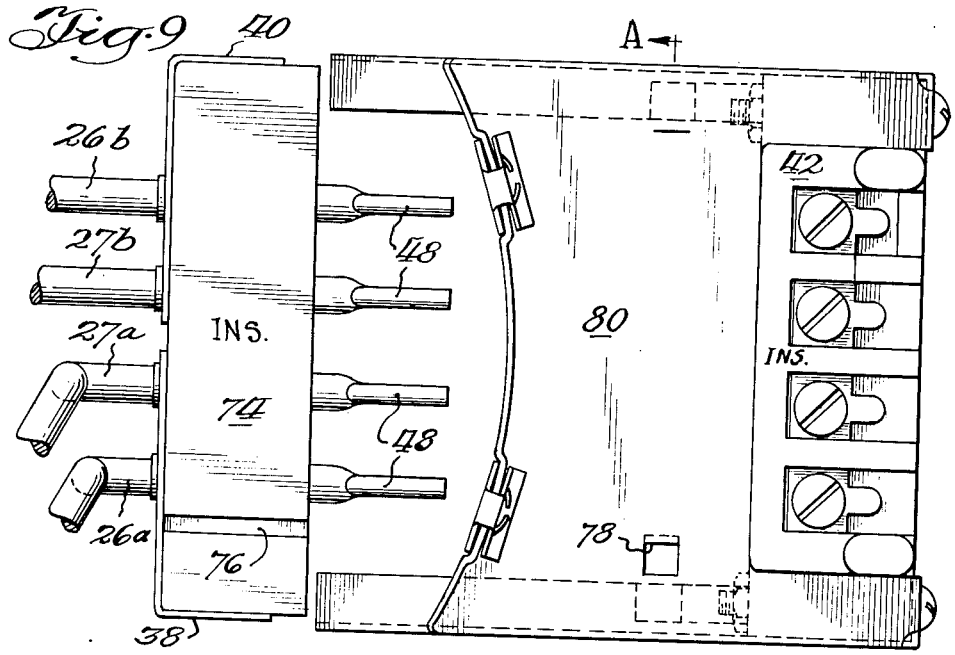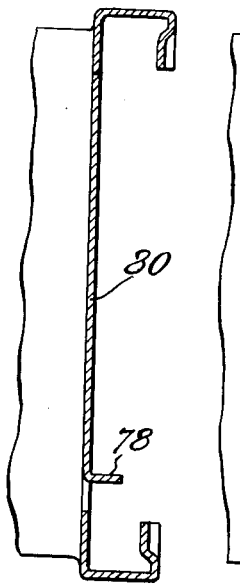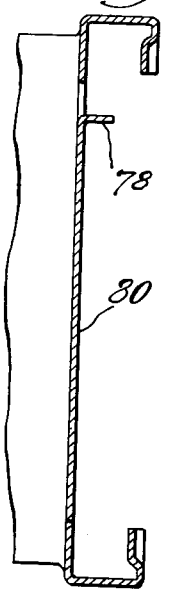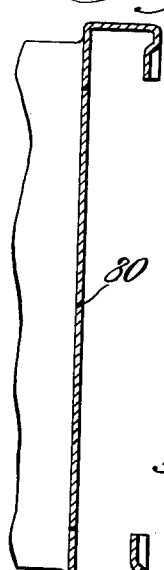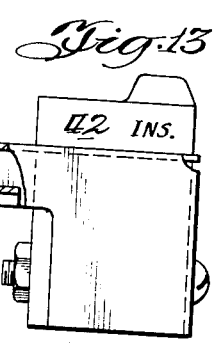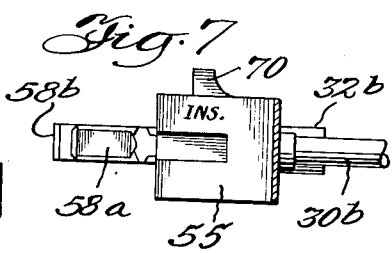

United States Patent Office 3,200,237
Patented Aug. 10, 1965

3,200,237
HEATING UNIT
Leroy C. Hanson, Elmhurst, Ill., assignor to Ferro Corporation, a corporation of Ohio
Filed Feb. 6, 1963, Ser. No. 256,661
3 Claims. (Cl. 219—451)

This invention relates to an electric heating unit for a stove or counter top cooking assembly, and more particularly to a heating unit including a thermostatic sensing device therein.

This application is a continuation in part of an application by Leroy C. Hanson, Serial No. 11,824, entitled "Heating Unit," filed February 29, 1960 now Patent No. 3,087,042 issued April 23, 1963.

An electric heating unit for cooking and the like may comprise a coiled heating element mounted on a multi-arm support or spider which rests on shoulders in a ring or pan carried in an opening in a cooking surface. A thermostatic sensing device may also be included in the electric heating unit to ensure a constant pre-set cooking temperature. The heating element and thermostatic sensing device each have terminal end portions which are separately connected with a source of electric power, through suitable manual or automatic control circuitry.

It is therefore an object of this invention to provide a new and improved terminal block and guide assembly construction for the terminal end portions of the heating element and the thermostatic sensing device which permits ready removal of the heating unit from its support for cleaning, repair or replacement.

Another object of the present invention is to provide for two electrical heating units in a range, each having plug-in elements, receptacles and supports for each element, and means associated with at least one of the receptacles and elements for blocking entry of an element into the incorrect receptacle. This is particularly important in a stove having one or more units with a thermostatic sensing device to ensure that the sensing element is not inadvertently connected across a power circuit or in a stove having units using two different voltages, i.e. 110 volts and 220 volts, to ensure that the 110 volts unit is not placed in the 220 volt receptacle and vice versa.

Other objects and advantages will become readily apparent from the following detailed description taken in connection with the accompanying drawings, in which:

FIG. 1 is a plan view of a pair of heating elements mounted in an electric range;

FIG. 2 is an enlarged fragmentary perspective of the terminal block and guide arrangement with the heating element partially removed;

FIG. 3 is a plan view of a heating element including a thermostatic sensing device;

FIG. 4 is an enlarged fragmentary exploded plan view of the terminal block arrangement of FIG. 3;

FIG. 5 is a section taken generally along line 5—5 of FIG. 4;

FIG. 6 is a view similar to FIG. 5 with the thermostatic sensing device terminal block fully inserted;

FIG. 7 is a vertical section taken generally along line 7—7 of FIG. 4;

FIG. 8 is a fragmentary plan view of a modified interlock arrangement;

FIG. 9 is an exploded plan view of the modified terminal blocks and guide structure, with the terminal blocks partially separated;

FIGS. 10, 11 and 12 represent three various forms of the modified embodiment of FIG. 9 taken at line A—A; and FIG. 13 is a side elevation of the modified embodiment shown in FIG. 9.

While illustrative embodiments of the invention are shown in the drawings and will be described in detail herein, the invention is susceptible of embodiment in many different forms and it should be understood that the present disclosure is to be considered as an exemplification of the principles of the invention and is not intended to limit the invention to the embodiments illustrated. The scope of the invention will be pointed out in the appended claims.

Electrical surface heating units are widely used in ranges or stoves and in built-in cooking assemblies. In general, these heating units have a flat coiled heating element containing an electrical resistance supported in a metallic sheath by an electrical insulating material and include a thermostatic device mounted at the center of the coil. The coiled unit, including the element and the thermostatic device, is mounted on a supporting framework or spider received in a ring set in or formed in a surface of the stove or built-in unit. The terminal end portions of the heating element extend through a wall in the supporting ring, or in a drip pan carried by it, and are connected with electrical conductors through which the element is energized. Many such units incorporate a hinge arrangement about which the element and its support may be pivoted upwardly to permit cleaning. This pivotal mounting requires substantial space beneath the cooking surface to accommodate movement of the terminal end portions of the element, the connecting conductors, and in many cases a terminal block structure. A novel construction is disclosed herein providing a terminal block guide and support which allows manipulation and removal or replacement of the heating element within a minimum of space and which also provides an interlocking protection device which will prevent the terminal ends of the thermostatic device from completing the circuit wired for the heating element and vice versa.

Referring now to the drawings, FIG. 1 discloses a pair of heating elements 10 and 12 illustrated in their environment in the top of a range 14. The range includes the usual control knobs 16. A removable ring 18 (FIG. 2) has an outwardly extending curved flange 20 which rests on top of the cooking surface 14 and includes a depending wall 22 which terminates below the cooking surface in an inwardly directed lip 24.

A removable drip pan (not shown) may rest on lip 24 enclosing the area beneath heating units 10 and 12. The heating unit 10 includes a pair of heating elements 26 and 27 and a terminal block 28. The heating unit 12, as best shown in FIG. 3, includes a heating element 30 and thermostatic sensing device 32 mounted in the center thereof.

Both the heating units 10 and 12 are supported in a similar manner on the range surface 14; that is, mounted on the arms of a supporting structure or spider 34 received within the circular opening defined by wall 22 and resting on the lip 24 above the drip pan. Each of the heating elements 26, 27 and 30 have a pair of terminal end portions, 26a, 26b; 27a, 27b; and 30a, 30b; respectively, which extend downwardly and outwardly from the element proper through an opening 36 in the wall 22.

As the construction of heating units 10 and 12 are similar where the heating element and the terminal block are joined, a description will be given only of heating unit 10, the heating unit having a pair of heating elements and no thermostatic sensing device. In actual practice the thermostatic sensing device joins the terminal block at the same place as the second heating element. The terminal end portions of the elements are generally aligned in a horizontal plane and loosely joined together by a terminal block of a suitable insulating and heat resistant material. The outermost of the aligned terminal end portions, 26a and 26b, have secured thereto plates 38 and 40 which plates are then attached to the terminal block in a well known manner.

A fixed terminal block 42, also of an electrical insulating and heat resistant material, is carried by a pair of bracket members 44 and 46 which have upward extensions 46a secured to the outer surface of depending wall portion 22 of the unit supporting ring 18. Female receptacles or contacts (not shown) are provided in the body of block 42 to receive the male contact portions 48 attached to the terminal ends of the heating elements as is well known in the art. Binding screws 50 on the upper surface of terminal block 42 are provided for the attachment of conductors connected with an external source of power (not shown).

The bracket structures 44 and 46 which support terminal block 42 serve as guides for the insertion and removal of terminal block 28. The brackets include a pair of U-shaped channel portions 52 and 54, the legs of which open toward each other and which are roughly coincident with the extensions of the edges of opening 36 through which the element terminal block 28 is inserted and removed. Upon insertion of the heating element assembly the portion of the supporting spider 34 opposite terminal block 28 must be elevated to clear the top of the flange 20 of the supporting ring and accordingly the terminal block is tilted from its end position. The spacing between the guide channel legs, as 52a and 52b, is slightly greater than thickness of block 28 to accommodate necessary manipulation of terminal block 28.

As is shown in FIG. 2, terminal block 28 which connects the element ends of a heating unit without a thermostatic sensing device will slide easily into position as discussed hereinabove as there are no obstructions present and a good electrical contact between the male contacts 48 and the female contacts (not shown) in terminal block 42 will be completed.

It is, however, necessary that heating unit 12 be prevented from entering a terminal block, as 42, which is manufactured and connected for a heating unit without a thermostatic sensing device. Therefore, it is necessary that blocking means be provided to eliminate the possibility of interchanging the two heating units 10 and 12 with their respective terminal blocks 42 and 56. As illustrated in FIG. 3, the heating unit 12 includes a single heating element 30 having terminal end portions 30a and 30b. The heating element 30 is mounted, similar to heating elements 26 and 27, on a spider support 34 which carries as its center a thermo-sensing device 32 having a pair of terminal end portions 32a and 32b. The element 30 and sensing device 32 are supported in a suitable ring structure similar to 20.

A terminal block 55 loosely joins the terminal end portions 30a–30b and 32a–32b which are provided with male contact elements 58a and 58b, respectively. Fixed terminal block 56 is carried by brackets 60 which are attached to ring 20 similarly to guide channels 52 and 54 as described hereinabove. Terminal block 56 has four female contacts (not shown) which receive the male contacts 58a and 58b. Binding posts 62 which connect with the heating element are connected through conductors with the power output terminals of a control circuit 66. Binding posts 64 which connect with the thermo-sensing device 32 are coupled with the control circuit, which is connected through conductors 68 with a suitable source of power as 110 volts A.C. The operation of the control system is not a part of this invention and it is sufficient to say that thermo-sensing device 32 is responsive to the temperature of a pan or other article being heated, turning the electrical power to the heating element on and off to maintain a desired or pre-set temperature.

The thermo-sensing device 32 which may be a bi-metal strip, would be damaged or destroyed if it were connected with a source of energized potential (220 volts) such as used for the heating elements. As the construction of the unit of FIG. 3 is quite similar to that of FIG. 2 and units of both types are commonly used in a single stove or cooking assembly as shown in FIG. 1, it is desirable to provide some means for preventing the insertion of the heating element assembly including the thermo-sensing device in the receptacle of FIG. 2 where the device could accidentally be subjected to a high voltage. Accordingly, the element terminal block 55 of the unit of FIG. 3 is provided with a pair of upstanding ears 70. The guide channels 52 and 54 (FIG. 2) have extension portions 72 on the upper legs thereof which project inwardly toward each other a sufficient distance to bar the passage of ears 70, if the assembly of FIG. 3 should inadvertently be inserted in the receptacle of FIG. 2.

A modified interlock arrangement is illustrated in FIG. 8 where the element terminal block 74 of a two-element unit is provided with a groove 76 in its upper surface which accommodates or mates with a down-turned lip 78 formed in a plate 80 bridging the terminal block guides. Where this structure is used for a two-element unit, the element terminal block of a single element thermo control unit has no such groove preventing its insertion in an incorrect receptacle.

As shown in FIGS. 10, 11 and 12, the downwardly turned portion 78 may be placed on either side of the spanning member 80 or removed completely. This allows for various combinations of terminal block 74 having various grooves 76 therein and it will be seen that only certain combinations of grooves 76 and projections 78 will permit insertion of the male contacts into the female contacts thus preventing all but the proper and desired heating element units from being connected to the control circuits of the electric range. It may be seen that these blocking means may also be used to prevent the insertion of a 110 volt unit in a 220 volt receptacle and vice versa when used as described above.

In certain thermo-control circuits 66 it is necessary that the connection between the binding screws 64 never be open-circuited, even though the element assembly itself is removed. A pair of flexible contact strips 82 and 84 are connected, one to each of binding posts 64, and have portions lying along the rear face of terminal block 56. The end 82' of contact strip 82 overlies a portion of strip 84 shorting the terminals together. A pusher member 86 is carried in an opening 88 in the wall of terminal block 56 in a position to be engaged by one of the terminals 58b associated with the circuit of the thermo-sensing element 32. When the element assembly is received in ring 20, pusher member 86 forces contact portion 82' outwardly breaking the contact with connector 84. However, when the element assembly is removed the two connectors contact each other shorting the control circuit. It will be noted that the male terminals 58b are slightly longer than terminals 58a associated with the heating element. This extra length is necessary to open the short circuit, and if a dual heating element assembly is inadvertently inserted into the receptacle of FIG. 3 the circuit is not opened and control circuit 66 is not subjected to damage by having a high resistance connected across it.

Thus, various means of providing a blocking system for preventing the insertion of thermo-sensing devices into two-element receptacles and vice versa has been shown, and a simple convenient, yet sure means, has been provided to prevent damage from placing of wrong heating units in the wrong receptacles.

I claim:
1. In a stove: two electrical heating units having similar terminal arrangements and each constructed for use with a different voltage, each unit having a plug-in receptacle and a supporting bracket therefor for receiving said terminals, a terminal block carried by the terminals of one of said units, said terminal block being provided with a groove and a downwardly turned lip on the supporting bracket of the plug-in receptacle for cooperation with said groove, said lip blocking or permitting passage of the terminal block depending upon the position of the groove in said terminal block.

2. In a stove: two electrical heating units of similar size and having a similar terminal arrangement, one with two electrical heating elements and the other with one electrical heating element and a temperature sensing element, each unit having a plug-in receptacle and a supporting bracket therefor for receiving said terminals, a terminal block carried by said terminals, a bracket supporting said plug-in receptacle, blocking means comprising interengaging elements on said terminal block and supporting bracket for blocking entry of the sensing element terminals into the receptacle for the other unit, said blocking means including an upstanding ear on a terminal block carried by said terminals and a blocking portion on the supporting bracket of the plug-in receptacle for the other unit, said blocking portion obstructing the passage of said ear.

3. In a stove: two electrical heating units of similar size and having a similar terminal arrangement, one with two electrical heating elements and the other with one electrical heating element and a temperature sensing element, each unit having a plug-in receptacle and a supporting bracket therefor for receiving said terminals, a terminal block carried by said terminals, a bracket supporting said plug-in receptacle, and blocking means comprising interengaging elements on said terminal block and supporting bracket for blocking entry of the sensing element terminals into the receptacle for the other unit, said blocking means including a groove on a terminal block carried by said terminals and a downwardly turned lip on the supporting bracket of the plug-in receptacle for the other unit cooperating with said groove, said lip blocking or permitting passage of the terminal block depending upon the position of the groove in said terminal block.

References Cited by the Examiner

UNITED STATES PATENTS

| | | | |
|---|---|---|---|
| 2,236,167 | 3/41 | David | 339—186 |
| 3,017,491 | 1/62 | Ammerman | 219—452 |
| 3,021,414 | 2/62 | Sand | 219—451 |
| 3,077,571 | 2/63 | Curtis et al. | 339—186 |
| 3,087,042 | 4/63 | Hanson | 219—451 |

RICHARD M. WOOD, *Primary Examiner.*